United States Patent
Ji

(10) Patent No.: US 10,854,136 B2
(45) Date of Patent: Dec. 1, 2020

(54) ORGANIC LIGHT EMITTING DIODE DISPLAY DEVICE

(71) Applicant: LG ELECTRONICS INC., Seoul (KR)

(72) Inventor: Jongeui Ji, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/407,643

(22) Filed: May 9, 2019

(65) Prior Publication Data
US 2020/0202772 A1 Jun. 25, 2020

(30) Foreign Application Priority Data

Dec. 21, 2018 (KR) .................. 10-2018-0167322
Mar. 29, 2019 (KR) .................. 10-2019-0037334

(51) Int. Cl.
*G09G 3/3208* (2016.01)
*G09G 3/20* (2006.01)
*H04N 5/57* (2006.01)

(52) U.S. Cl.
CPC ......... *G09G 3/3208* (2013.01); *G09G 3/2003* (2013.01); *H04N 5/57* (2013.01); *G09G 2320/0257* (2013.01); *G09G 2320/043* (2013.01); *G09G 2320/0686* (2013.01)

(58) Field of Classification Search
CPC ............... G09G 3/3208; G09G 3/2003; G09G 2320/0257; G09G 2320/043; G09G 2320/0686; H04N 5/57
See application file for complete search history.

(56) References Cited

U.S. PATENT DOCUMENTS

| | | | |
|---|---|---|---|
| 2008/0123906 A1* | 5/2008 | Mori | G06K 9/0061 382/117 |
| 2016/0269693 A1* | 9/2016 | Moriguchi | H04N 9/045 |
| 2018/0226460 A1* | 8/2018 | Zhu | G09G 3/3208 |
| 2018/0226466 A1* | 8/2018 | Yamamoto | G09G 3/3233 |
| 2018/0226595 A1* | 8/2018 | Liu | G09G 3/3225 |
| 2018/0226615 A1* | 8/2018 | Uchida | H01L 51/5209 |

FOREIGN PATENT DOCUMENTS

| | | |
|---|---|---|
| KR | 1020160092335 | 8/2016 |
| KR | 1020170049241 | 5/2017 |

OTHER PUBLICATIONS

European Patent Office Application Serial No. 19174574.4, Search Report dated Jun. 18, 2019, 17 pages.

* cited by examiner

*Primary Examiner* — Sejoon Ahn
(74) *Attorney, Agent, or Firm* — Lee, Hong, Degerman, Kang & Waimey PC

(57) ABSTRACT

An organic light emitting diode (OLED) display device is provided. The OLED display device includes a display configured to display a video and a controller configured to control the display, wherein the controller senses a fixed region in the video, obtains RGB data of the sensed fixed region, and reduces a saturation of the fixed region, based on the RGB data.

14 Claims, 15 Drawing Sheets

(a)

(b)

(a)

(b)

(a)

(b)

| (60,80,100) 10A | (255,250,100) 10A | (30,50,50) 10A | (50,50,50) 10A | (50,50,50) 10A | (230,0,50) 10A |
|---|---|---|---|---|---|
| (5,0,50) 10A | (30,0,50) 10A | (130,75,80) 10A | (20,10,50) 10A | (0,50,50) 10A | (230,50,50) 10A |
| (80,60,70) 10A | (30,0,0) 10A | (200,180,80) 10A | (0,70,90) 10A | (230,250,255) 10A | (10,10,200) 10A |
| (170,150,10) 10A | (230,150,0) 10A | (200,150,50) 10A | (50,80,60) 10A | (15,0,200) 10A | (0,90,90) 10A |
| (0,0,50) 10A | (30,250,250) 10A | (0,0,0) 10A | (0,50,0) 10A | (30,0,230) 10A | (70,80,0) 10A |
| (0,0,50) 10A | (20,45,50) 10A | (170,170,170) 10A | (200,10,0) 10A | (0,250,10) 10A | (100,0,0) 10A |

| (60,80,100) 10A | (255,250,100) 10A | (30,50,50) 10A | (50,50,50) 10A | (50,50,50) 10A | (230,0,50) 10A |
|---|---|---|---|---|---|
| (5,0,50) 10A | (30,0,50) 10A | (130,75,80) 10A | (20,10,50) 10A | (0,50,50) 10A | (230,50,50) 10A |
| (80,60,70) 10A | (30,0,0) 10A | (200,180,80) 10A | (0,70,90) 10A | (230,250,255) 10A | (10,10,200) 10A |
| (170,150,10) 10A | (230,150,0) 10A | (200,150,50) 10A | (50,80,60) 10A | (15,0,200) 10A | (0,90,90) 10A |
| (0,0,50) 10A | (30,250,250) 10A | (0,0,0) 10A | (0,40,0) 9A | (24,0,184) 9A | (70,80,0) 10A |
| (0,0,50) 10A | (20,45,50) 10A | (170,170,170) 10A | (160,8,0) 9A | (0,200,8) 9A | (100,0,0) 10A | ns
ORGANIC LIGHT EMITTING DIODE DISPLAY DEVICE

CROSS-REFERENCE TO RELATED APPLICATIONS

Pursuant to 35 U.S.C. § 119(a), this application claims the benefit of earlier filing date and right of priority to Korean Patent Application Nos. 10-2018-0167322, filed on Dec. 21, 2018 and 10-2019-0037334, filed on Mar. 29, 2019, the contents of which are all hereby incorporated by reference herein in their entirety.

BACKGROUND

Field of the Invention

The present invention relates to an organic light emitting diode display device, and more particularly, to an organic light emitting diode display device for reducing an afterimage.

Discussion of the Related Art

Recently, the kinds of display devices are being diversified. Here, organic light emitting diode display devices (hereinafter referred to as OLED display devices) are being much used.

OLED display devices are self-emitting devices, and thus, in comparison with liquid crystal display (LCD) devices requiring a backlight, the OLED display devices are low in consumption power and may be thinly manufactured. Also, the OLED display devices have a wide viewing angle and a fast response time.

The OLED display devices may include a plurality of pixels and may display a video having various colors by using the pixels.

The OLED display devices may be RGB OLED display devices configured with three subpixels respectively emitting red light, green light, and blue light, or may be WRGB OLED display devices configured with four subpixels respectively emitting white light, red light, green light, blue light.

The OLED display devices may supply a certain current to the plurality of pixels to display a video, based on video data.

At this time, since a high current is continually supplied to at least one pixel, at least one subpixel can be degraded, and in this case, when a video is not output, an afterimage problem where a video is shown like remaining can occur.

An example of a method for solving such an afterimage problem is described in Korean Patent Publication No. 10-2016-0019341, and a configuration for reducing luminance to decreasing a speed at which a lifetime of each pixel is shortened is described for solving the afterimage problem.

A lifetime of each of a red pixel, a green pixel, and a blue pixel is shorter than that of a white pixel, and due to this, even in a case where luminance is adjusted, when a color video is continually displayed, a lifetime of at least one of the red pixel, the green pixel, and the blue pixel is rapidly reduced, causing a problem where an effect of solving the afterimage problem is slight.

SUMMARY

An aspect of the present invention is directed to providing an OLED display device for minimizing the occurrence of an afterimage.

Another aspect of the present invention is directed to providing an OLED display device which decreases saturation of a fixed region, thereby minimizing a reduction in lifetime of each pixel and the occurrence of an afterimage.

Another aspect of the present invention is directed to providing an OLED display device which decreases luminance of a fixed region simultaneously when reducing saturation of the fixed region, thereby increasing an effect of preventing the occurrence of an afterimage.

An organic light emitting diode (OLED) display device may sense a fixed region in the video, obtain RGB data of the sensed fixed region, and reduce a saturation of the fixed region, based on the RGB data.

A controller may calculate a value of saturation information of the fixed region, based on the RGB data of the fixed region, and when the value of saturation information is equal to or greater than a predetermined reference value, the controller may reduce the saturation of the fixed region.

The controller may obtain a saturation correction rate, based on the value of saturation information and may correct the RGB data of the fixed region according to the saturation correction rate to reduce the saturation of the fixed region.

The OLED display device may further include a memory configured to store a lookup table to which the saturation correction rate based on the value of saturation information is mapped, and the controller may obtain the saturation correction rate, based on the lookup table.

When the value of saturation information is within a second range which is greater in value than the first range, the controller may set the saturation correction rate to a second rate which is greater than the first rate.

As the value of saturation information increases, the controller may decrease the saturation correction rate to a predetermined rate.

The controller may decrease a luminance of the fixed region when reducing the saturation of the fixed region.

When the value of saturation information is equal to or greater than the predetermined reference value, the controller may obtain the saturation correction rate and a luminance correction rate, based on the value of saturation information, correct the RGB data of the fixed region according to the saturation correction rate, and decrease a current supplied to a pixel included in the display according to the luminance correction rate.

The luminance correction rate may be less than the saturation correction rate.

The display may include a panel where a plurality of pixels are disposed, a gate driver and a data driver each configured to drive the panel, and a timing controller including a data receiver configured to receive RGB data from the controller, a data aligner configured to correct the RGB data, a control signal generator configured to generate a control signal of each of the gate driver and the data driver, and a data transmitter configured to transmit, to the gate driver and the data driver, corrected RGB data output from the data aligner and the control signal.

DETAILED DESCRIPTION OF THE DISCLOSURE

Hereinafter, the present invention will be described in detail with reference to the drawings.

The suffixes "module" and "unit" for components used in the description below are assigned or mixed in consideration of easiness in writing the specification and do not have distinctive meanings or roles by themselves.

Figure 1:
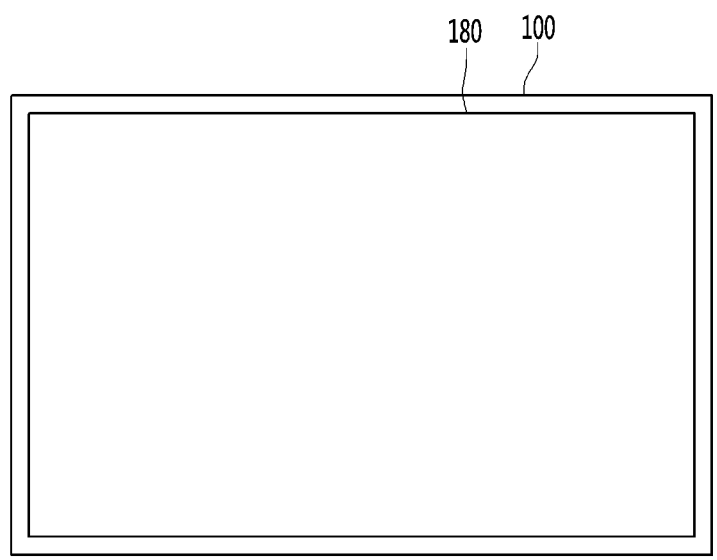
FIG. 1 is a diagram illustrating a display device according to an embodiment of the present invention.

FIG. 1 is a diagram illustrating a display device according to an embodiment of the present invention.

With reference to the drawings, a display device 100 includes a display 180.

On the other hand, the display 180 is realized by one among various panels. For example, the display 180 is one of the following panels: a liquid crystal display panel (LCD panel), an organic light-emitting diode (OLED) panel (OLED panel), and an inorganic light-emitting diode (OLED) panel (ILED panel).

According to the present invention, the display 180 is assumed to include an organic light-emitting diode (OLED) panel (OLED).

On the other hand, examples of the display device 100 in FIG. 1 include a monitor, a TV, a tablet PC, a mobile terminal, and so on.

Figure 2:
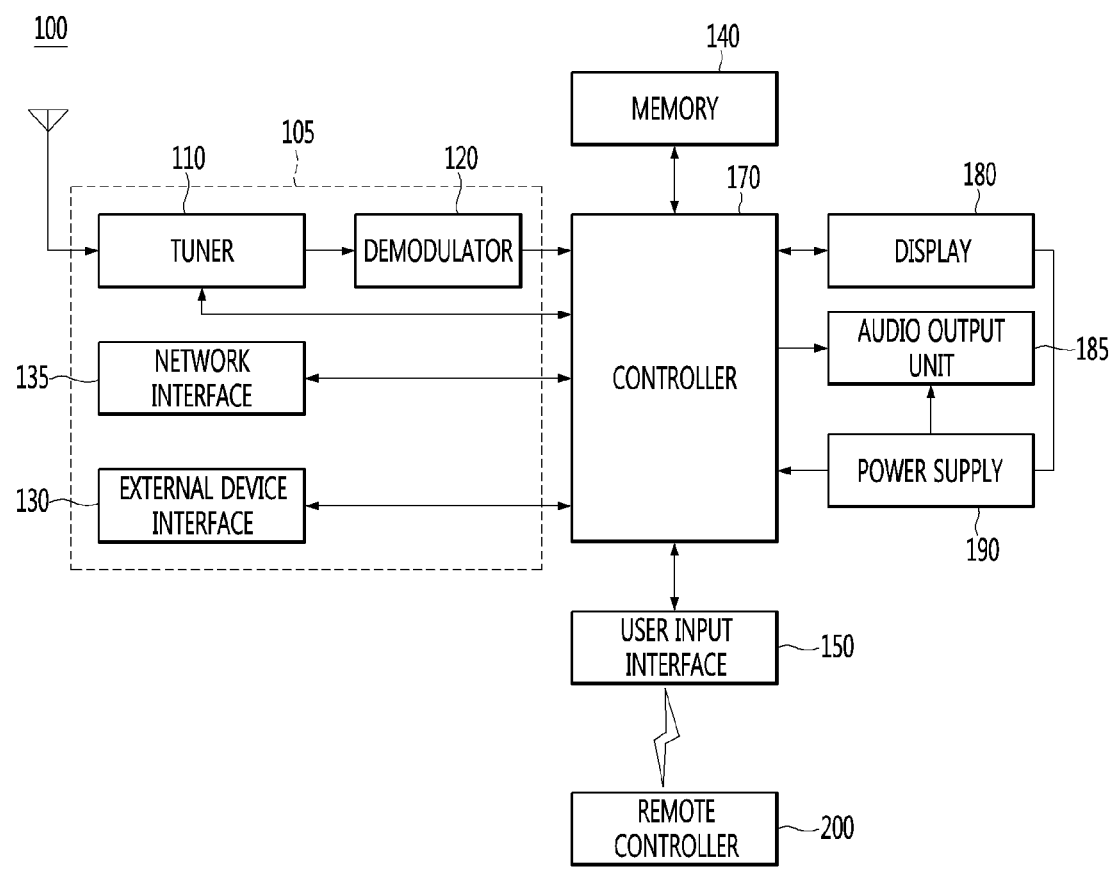
FIG. 2 is an example of a block diagram of the inside of the display device in FIG. 1.

FIG. 2 is an example of a block diagram of the inside of the display device in FIG. 1.

With reference to FIG. 2, the display device 100 according to an embodiment of the present invention includes a broadcast reception unit 105, an external device interface 130, a memory 140, a user input interface 150, a sensor unit (not illustrated), a controller 170, a display 180, an audio output unit 185, and a power supply unit 190.

The broadcast reception unit 105 includes a tuner unit 110, a demodulator 120, a network interface 135, and an external device interface 130.

On the other hand, unlike in the drawings, it is also possible that the broadcast reception unit 105 only includes the tuner unit 110, the demodulator 120, and the external device interface 130. That is, the network interface 135 may not be included.

The tuner unit 110 selects a radio frequency (RF) broadcast signal that corresponds to a channel which is selected by a user, or RF broadcast signals that correspond to all channels that are already stored, among RF broadcast signals that are received through an antenna (not illustrated). In addition, the selected RF broadcast signal is converted into an intermediate frequency signal, a baseband image, or an audio signal.

For example, the selected RF broadcast signal, if is a digital broadcast signal, is converted into a digital IF (DIF) signal, and, if is an analog broadcast signal, is converted into an analog baseband image or an audio signal (CVBS/SIF). That is, the tuner unit 110 processes a digital broadcast signal or an analog broadcast signal. The analog baseband image or the audio signal (CVBS/SIF) output from the tuner unit 110 is input directly into the controller 170.

On the other hand, the tuner unit 110 possibly includes a plurality of tuners in order to receive broadcast signals in a plurality of channels. In addition, it is also possible that a signal tuner that receives the broadcast signals in the plurality of channels at the same time is included.

The demodulator 120 receives a digital IF (DIF) signal that results from the conversion in the tuner unit 110 and performs a demodulation operation on the received digital IF signal.

The demodulator 120 performs demodulation and channel decoding, and then outputs a stream signal (TS). At this time, the stream signal is a signal that results from multiplexing image signals, audio signals, or data signals.

The stream signal output from the demodulator 120 is input into the controller 170. The controller 170 performs demultiplexing, video and audio signal processing, and so on, and then outputs the resulting image to the display 180 and outputs the resulting audio to the audio output unit 185.

The external device interface 130 transmits or receives data to and from an external apparatus (not illustrated) connected, for example, a set-top box. To do this, the external device interface 130 includes an A/V input and output unit (not illustrated).

The external device interface 130 is connected in a wired or wireless manner to an external apparatus, such as a digital versatile disc (DVD), a Blu-ray disc, a game device, a camera, a camcorder, a computer (a notebook computer), or a set-top box, and may perform inputting and outputting operations for reception and transmission of data to and from the external apparatus.

An image and an audio signal of the external apparatus are input into the A/V input and output unit. On the other hand, a wireless communication unit (not illustrated) performs a short-distance wireless communication with a different electronic apparatus.

Through the wireless communication unit (not illustrated), the external device interface 130 transmits and receives data to and from the nearby mobile terminal (not illustrated). Particularly, in a mirroring mode, the external device interface 130 receives device information, information on an application executed, an application image, and so on from the mobile terminal 600.

The network interface 135 provides an interface for connecting the display device 100 to wired and wireless networks including the Internet. For example, the network interface 135 receives items of content or pieces of data pieces that are provided by a content provider or a network operator through a network or the Internet.

On the other hand, the network interface 135 includes the wireless communication unit (not illustrated).

A program for controlling processing or control of each signal within the controller 170 may be stored in the memory 140. An image signal, an audio signal, or a data signal, which results from signal processing, may be stored in the memory 140.

In addition, an image signal, an audio signal, or a data signal, which is input into the external device interface 130, may be temporarily stored in the memory 140. In addition, information on a predetermined broadcast channel may be stored in the memory 140 through a channel storage function such as a channel map.

An embodiment in which the memory 140 is provided separately from the controller 170 is illustrated in FIG. 2, but the scope of the present invention is not limited to this. The memory 140 is included within the controller 170.

The user input interface 150 transfers a signal input by the user, to the controller 170, or transfers a signal from the controller 170 to the user.

For example, user input signals, such as power-on and -off signals, a channel selection signal, and a screen setting signal, are transmitted and received to and from a remote controller 200, user input signals that are input from local keys (not illustrated), such as a power key, a channel key, a volume key, and a setting key, are transferred to the controller 170, a user input signal input from the sensing unit (not illustrated) that senses a user's gesture is transferred to the controller 170, or a signal from the controller 170 is transmitted to the sensing unit (not illustrated).

The controller 170 demultiplexes a stream input through the tuner unit 110, the demodulator 120, the network interface 135, the external device interface 130, or processes signals that results from demultiplexing, and thus generates and outputs a signal for outputting an image and audio.

An image signal that results from image-processing in the controller 170 is input into the display 180, and an image that corresponds to the image signal is displayed. In addition, the image signal that results from the image-processing in the controller 170 is input into an external output apparatus through the external device interface 130.

An audio signal that results from processing in the controller 170 is output, as audio, to the audio output unit 185. In addition, an audio signal that results from processing in the controller 170 is input into an external output apparatus through the external device interface 130.

Although not illustrated in FIG. 2, the controller 170 includes a demultiplexer, an image processing unit, and so on. The details of this will be described below with reference to FIG. 3.

In addition, the controller 170 controls an overall operation within the display device 100. For example, the controller 170 controls the tuner unit 110 in such a manner that the tuner unit 110 performs selection of (tuning to) a RF broadcast that corresponds to a channel selected by the user or a channel already stored.

In addition, the controller 170 controls the display device 100 using a user command input through the user input interface 150, or an internal program.

On the other hand, the controller 170 controls the display 180 in such a manner that an image is displayed. At this time, the image displayed on the display 180 is a still image, or a moving image, and is a 2D image or a 3D image.

On the other hand, the controller 170 is configured to a predetermined object is displayed within the image displayed on the display 180. For example, the object is at least one of the following: a web screen (a newspaper, a magazine, or so on) connected, an electronic program guide (EPG), various menus, a widget, an icon, a still image, a moving image, and text.

On the other hand, the controller 170 recognizes a location of the user, based on an image captured by an imaging unit (not illustrated). For example, a distance (a z-axis coordinate) between the user and the display device 100 is measured. In addition, a x-axis coordinate and a y-axis coordinate within the display 180, which correspond to the location of the user are calculated.

The display 180 converts an image signal, a data signal, an OSD signal, a control signal that result from the processing in the controller 170, or an image signal, a data signal, a control signal, and so on that are received in the external device interface 130, and generates a drive signal.

On the other hand, the display 180 is configured with a touch screen, and thus is also possibly used as an input device, in addition to an output device.

The audio output unit 185 receives a signal that results from audio processing the controller 170, as an input, and outputs the signal, as audio.

The imaging unit (not illustrated) captures an image of the user. The imaging unit (not illustrated) is realized as one camera, but is not limited to the one camera. It is also possible that the image unit is realized as a plurality of cameras. Information of an image captured by the imaging unit (not illustrated) is input into the controller 170.

Based on the image captured by the imaging unit (not illustrated), or on an individual signal detected by the sensing unit (not illustrated) or a combination of the detected individual signals, the controller 170 detects the user's gesture.

A power supply unit 190 supplies required powers to the entire display device 100. Particularly, a power is supplied to the controller 170 realized in the form of a system-on-chip (SOC), the display 180 for image display, the audio output unit 185 for audio output, and so on.

Specifically, the power supply unit 190 includes a converter that converts an alternating current power into a direct current power, and a dc/dc converter that converts a level of the direct current power.

The remote controller 200 transmits a user input to the user input interface 150. To do this, the remote controller 200 employs Bluetooth, radio frequency (RF) communication, infrared (IR) communication, ultra-wideband (UWB), a ZigBee specification, and so on. In addition, the remote controller 200 receives an image signal, an audio signal, or a data signal output from the user input interface 150, and displays the received signal on a display unit of the remote controller 200 or outputs the received signal, as audio, to an output unit of the remote controller 200.

On the other hand, the display device 100 described above is a digital broadcast receiver that possibly receives a fixed-type or mobile-type digital broadcast.

On the other hand, a block diagram of the display device 100 illustrated in FIG. 2 is a block diagram for an embodiment of the present invention. Each constituent element in the block diagram is subject to integration, addition, or omission according to specifications of the display device 100 actually realized. That is, two or more constituent elements are to be integrated into one constituent element, or one constituent element is to be divided into two or more constituent elements. In addition, a function performed in each block is for description of an embodiment of the present invention, and specific operation of each constituent element imposes no limitation to the scope of the present invention.

Figure 3:
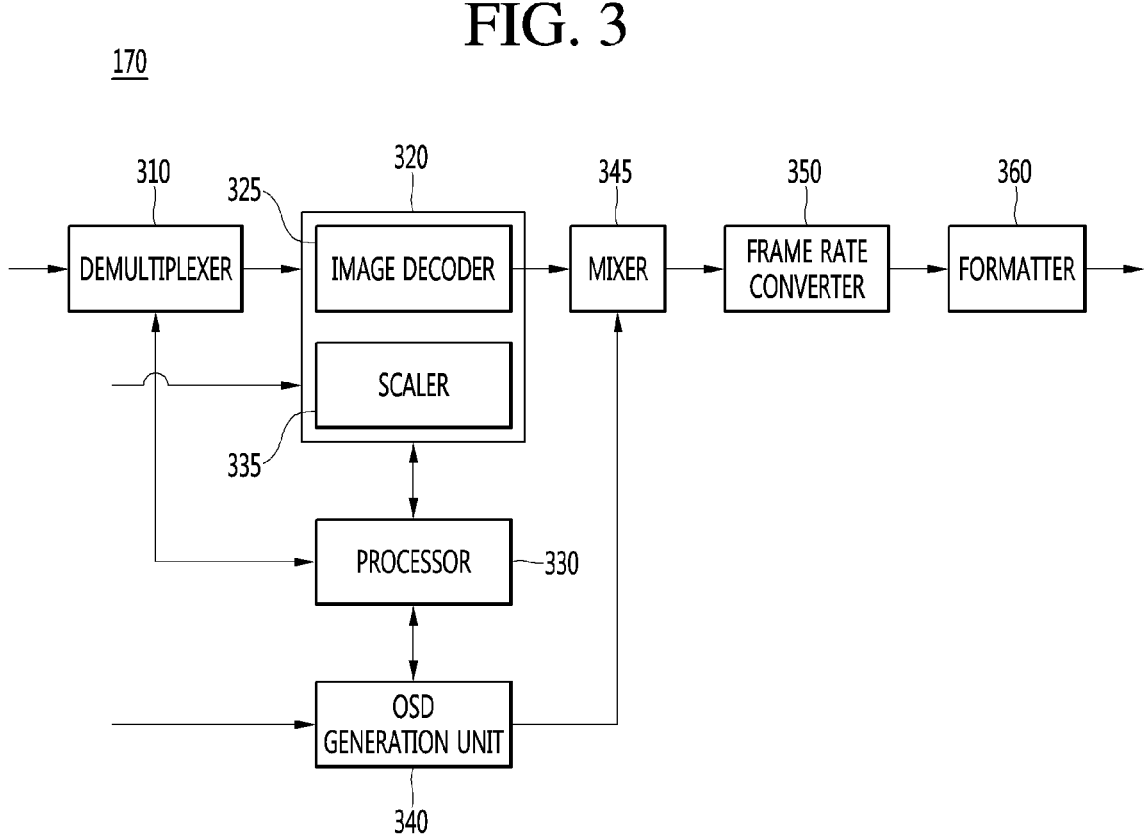
FIG. 3 is an example of a block diagram of the inside of a controller in FIG. 2.

FIG. 3 is an example of a block diagram of the inside of a controller in FIG. 2.

For description with reference to the drawings, the controller 170 according to an embodiment of the present invention includes a demultiplexer 310, an image processing unit 320, a processor 330, an OSD generation unit 340, a mixer 345, a frame rate converter 350, and a formatter 360. In addition, an audio processing unit (not illustrated) and a data processing unit (not illustrated) are further included.

The demultiplexer 310 demultiplexes a stream input. For example, in a case where an MPEG-2 TS is input, the MPEG-2 TS is demultiplexed into an image signal, an audio signal, and a data signal. At this point, a stream signal input into the demultiplexer 310 is a stream signal output from the tuner unit 110, the demodulator 120, or the external device interface 130.

The image processing unit 320 performs image processing of the image signal that results from the demultiplexing. To do this, the image processing unit 320 includes an image decoder 325 or a scaler 335.

The image decoder 325 decodes the image signal that results from the demultiplexing. The scaler 335 performs scaling in such a manner that a resolution of an image signal which results from the decoding is such that the image signal is possibly output to the display 180.

Examples of the image decoder 325 possibly include decoders in compliance with various specifications. For example, the examples of the image decoder 325 include a decoder for MPEG-2, a decoder for H.264, a 3D image decoder for a color image and a depth image, a decoder for a multi-point image, and so on.

The processor 330 controls an overall operation within the display device 100 or within the controller 170. For example, the processor 330 controls the tuner unit 110 in such a manner that the tuner unit 110 performs the selection of (tuning to) the RF broadcast that corresponds to the channel selected by the user or the channel already stored.

In addition, the processor 330 controls the display device 100 using the user command input through the user input interface 150, or the internal program.

In addition, the processor 330 performs control of transfer of data to and from the network interface 135 or the external device interface 130.

In addition, the processor 330 controls operation of each of the demultiplexer 310, the image processing unit 320, the OSD generation unit 340, and so on within the controller 170.

The OSD generation unit 340 generates an OSD signal, according to the user input or by itself. For example, based on the user input signal, a signal is generated for displaying various pieces of information in a graphic or text format on a screen of the display 180. The OSD signal generated includes various pieces of data for a user interface screen of the display device 100, various menu screens, a widget, an icon, and so on. In addition, the OSD generated signal includes a 2D object or a 3D object.

In addition, based on a pointing signal input from the remote controller 200, the OSD generation unit 340 generates a pointer possibly displayed on the display. Particularly, the pointer is generated in a pointing signal processing unit, and an OSD generation unit 340 includes the pointing signal processing unit (not illustrated). Of course, it is also possible that instead of being providing within the OSD generation unit 340, the pointing signal processing unit (not illustrated) is provided separately.

The mixer 345 mixes the OSD signal generated in the OSD generation unit 340, and the image signal that results from the image processing and the decoding in the image processing unit 320. An image signal that results from the mixing is provided to the frame rate converter 350.

The frame rate converter (FRC) 350 converts a frame rate of an image input. On the other hand, it is also possible that the frame rate converter 350 outputs the image, as is, without separately converting the frame rate thereof.

On the other hand, the formatter 360 converts a format of the image signal input, into a format for an image signal to be displayed on the display, and outputs an image that results from the conversion of the format thereof.

The formatter 360 changes the format of the image signal. For example, a format of a 3D image signal is changed to any one of the following various 3D formats: a side-by-side format, a top and down format, a frame sequential format, an interlaced format, and a checker box format.

On the other hand, the audio processing unit (not illustrated) within the controller 170 performs audio processing of an audio signal that results from the demultiplexing. To do this, the audio processing unit (not illustrated) includes various decoders.

In addition, the audio processing unit (not illustrated) within the controller 170 performs processing for base, treble, volume adjustment and so on.

The data processing unit (not illustrated) within the controller 170 performs data processing of a data signal that results from the demultiplexing. For example, in a case where a data signal that results from the demultiplexing is a data signal the results from coding, the data signal is decoded. The data signal that results from the coding is an electronic program guide that includes pieces of broadcast information, such as a starting time and an ending time for a broadcast program that will be telecast in each channel.

On the other hand, a block diagram of the controller 170 illustrated in FIG. 3 is a block diagram for an embodiment of the present invention. Each constituent element in the block diagram is subject to integration, addition, or omission according to specifications of the image display controller 170 actually realized.

Particularly, the frame rate converter 350 and the formatter 360 may be provided separately independently of each other or may be separately provided as one module, without being provided within the controller 170.

Figure 4A:
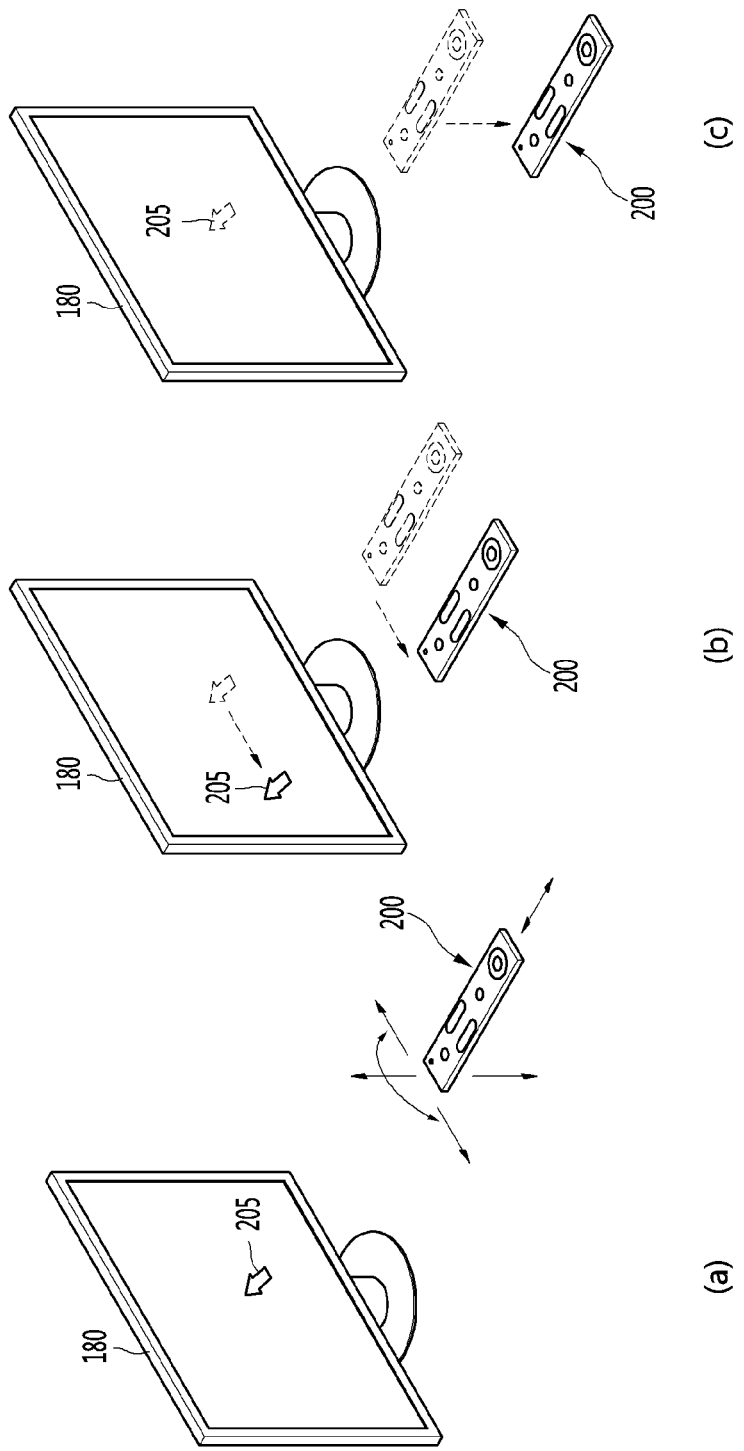
FIG. 4A is a diagram illustrating a method in which the remote controller in FIG. 2 performs control.

FIG. 4A is a diagram illustrating a method in which the remote controller in FIG. 2 performs control.

In FIG. 4A(a), it is illustrated that a pointer 205 which corresponds to the remote controller 200 is displayed on the display 180.

The user moves or rotates the remote controller 200 upward and downward, leftward and rightward (FIG. 4A(b)), and forward and backward (FIG. 4A(c)). The pointer 205 displayed on the display 180 of the display device corresponds to movement of the remote controller 200. As in the drawings, movement of the pointer 205, which depends on the movement of the remote controller 200 in a 3D space, is displayed and thus, the remote controller 200 is named a spatial remote controller or a 3D pointing device.

FIG. 4A(b) illustrates that, when the user moves the remote controller 200 leftward, the pointer 205 displayed on the display 180 of the display device correspondingly moves leftward.

Information on the movement of the remote controller 200, which is detected through a sensor of the remote controller 200, is transferred to the display device. The display device calculates the information on the movement of the remote controller 200 from coordinates of the pointer 205. The display device displays the pointer 205 in such a manner that the pointer 25 corresponds to the calculated coordinates.

FIG. 4A(c) illustrates a case where the user moves the remote controller 200 away from the display 180 in a state where a specific button within the remote controller 200 is held down. Accordingly, a selection area within the display 180, which corresponds to the pointer 205, is zoomed in so that the selection area is displayed in an enlarged manner Conversely, in a case where the user causes the remote controller 200 to approach the display 180, the selection area within the display 180, which corresponds to the pointer 205, is zoomed out so that the selection is displayed in a reduced manner. On the other hand, in a case where the remote controller 200 moves away from the display 180, the selection area may be zoomed out, and in a case where the remote controller 200 approaches the display 180, the selection area may be zoomed in.

On the other hand, an upward or downward movement, or a leftward or rightward movement is not recognized in a state where a specific button within the remote controller 200 is held down. That is, in a case where the remote controller 200 moves away from or approaches the display 180, only a forward or backward movement is set to be recognized without the upward or downward movement, or the leftward or rightward movement being recognized. Only the pointer 205 moves as the remote controller 200 moves upward, downward, leftward, or rightward, in a state where a specific button within the remote controller 200 is not held down.

On the other hand, a moving speed or a moving direction of the pointer 205 corresponds to a moving speed or a moving direction of the remote controller 200, respectively.

Figure 4B:
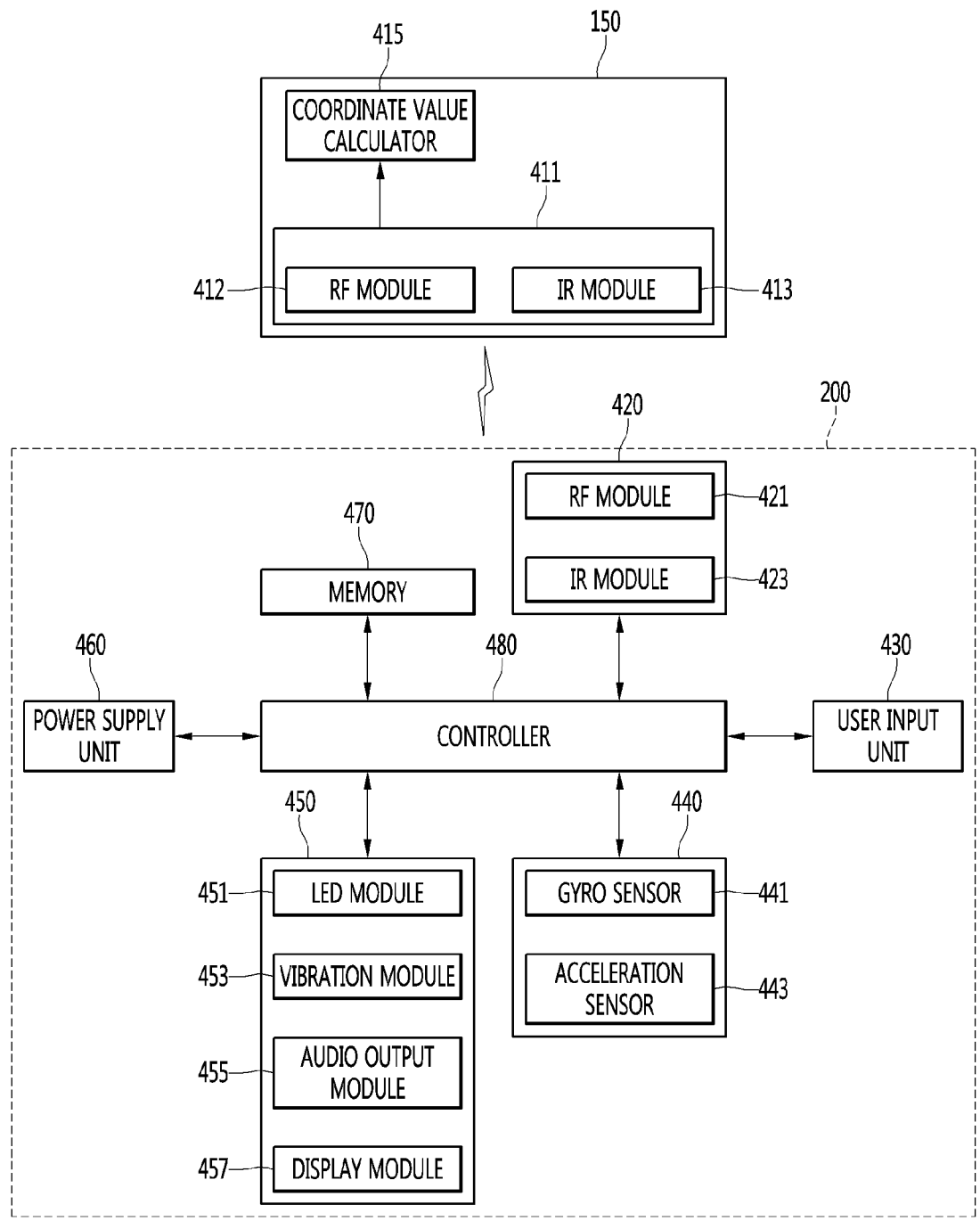
FIG. 4B is a block diagram of the inside of the remote controller in FIG. 2.

FIG. 4B is a block diagram of the inside of the remote controller in FIG. 2.

For description with reference to the drawings, the remote controller 200 includes a wireless communication unit 420, a user input unit 430, a sensor unit 440, an output unit 450, a power supply unit 460, a memory 470, and a controller 480.

The wireless communication unit 420 transmits and receives a signal to and from an arbitrary one of the display devices according to the embodiments of the present invention, which are described above. Of the display devices according to the embodiments of the present invention, one display device is taken as an example for description.

According to the present embodiment, the remote controller 200 includes an RF module 421 that transmits and receives a signal to and from the display device 100 in compliance with RF communication standards. In addition, the remote controller 200 includes an IR module 423 that possibly transmits and receives a signal to and from the display device 100 in compliance with IR communication standards.

According to the present embodiment, the remote controller 200 transfers a signal containing information on the movement of the remote controller 200 to the display device 100 through the RF module 421.

In addition, the remote controller 200 receives a signal transferred by the display device 100, through the RF module 421. In addition, the remote controller 200 transfers a command relating to power-on, power-off, a channel change, or a volume change, to the display device 100, through the IR module 423, whenever needed.

The user input unit 430 is configured with a keypad, buttons, a touch pad, a touch screen, or so on. The user inputs a command associated with the display device 100 into the remote controller 200 by operating the user input unit 430. In a case where the user input unit 430 is equipped with a physical button, the user inputs the command associated with the display device 100 into the remote controller 200 by performing an operation of pushing down the physical button. In a case where the user input unit 430 is equipped with a touch screen, the user inputs the command associated with the display device 100 into the remote controller 200 by touching on a virtual key of the touch screen. In addition, the user input unit 430 may be equipped with various types of input means operated by the user, such as a scroll key or a jog key, and the present embodiment does not impose any limitation on the scope of the present invention.

The sensor unit 440 includes a gyro sensor 441 or an acceleration sensor 443. The gyro sensor 441 senses information on the movement of the remote controller 200.

As an example, the gyro sensor 441 senses the information on operation of the remote controller 200 on the x-, y-, and z-axis basis. The acceleration sensor 443 senses information on the moving speed and so on of the remote controller 200. On the other hand, a distance measurement sensor is further included. Accordingly, a distance to the display 180 is sensed.

The output unit 450 outputs an image or an audio signal that corresponds to the operating of the user input unit 430 or corresponds to a signal transferred by the display device 100. Through the output unit 450, the user recognizes whether or not the user input unit 430 is operated or whether or not the display device 100 is controlled.

As an example, the output unit 450 includes an LED module 451, a vibration module 453, an audio output module 455, or a display module 457. The LED module 451, the vibration module 453, the audio output module 455, and the display module 457 emits light, generates vibration, outputs audio, or outputs an image, respectively, when the input unit 435 is operated, or a signal is transmitted and received to and from the display device 100 through a wireless communication unit 420.

The power supply unit 460 supplies a power to the remote controller 200. In a case where the remote controller 200 does not move for a predetermined time, the power supply unit 460 reduces power consumption by interrupting power supply. In a case where a predetermined key provided on the remote controller 200 is operated, the power supply unit 460 resumes the power supply.

Various types of programs, pieces of application data, and so on that are necessary for control or operation of the remote controller 200 are stored in the memory 470. In a case where the remote controller 200 transmits and receives a signal to and from the display device 100 in a wireless manner through the RF module 421, the signal is transmitted and received in a predetermined frequency band between the remote controller 200 and the display device 100. The controller 480 of the remote controller 200 stores information on, for example, a frequency band in which data is transmitted and received in a wireless manner to and from the display device 100 paired with the remote controller 200, in the memory 470, and makes a reference to the stored information.

The controller 480 controls all operations associated with the control by the remote controller 200. The controller 480 transfers a signal that corresponds to operating of a predetermined key of the user input unit 430, or a signal that corresponds to the movement of the remote controller 200, which is sensed in the sensor unit 440, to the display device 100 through the wireless communication unit 420.

A user input interface 150 of the display device 100 includes a wireless communication unit 411 that transmits and receives a signal in a wireless manner to and from the remote controller 200, and a coordinate value calculator 415 that calculates a coordinate value of the pointer, which corresponds to the operation of the remote controller 200.

The user input interface 150 transmits and receives the signal in a wireless manner to and from the remote controller 200 through the RF module 412. In addition, a signal transferred in compliance with the IR communication standards by the remote controller 200 through the IR module 413 is received.

The coordinate value calculator 415 calculates a coordinate value (x, y) of the pointer 205 to be displayed on the display 180, which results from compensating for a hand movement or an error, from a signal that corresponds to the operation of the remote controller 200, which is received through the wireless communication unit 411.

A transfer signal of the remote controller 200, which is input into the display device 100 through the user input interface 150 is transferred to the controller 170 of the display device 100. The controller 170 determines information on the operation of the remote controller 200 and information on operating of a key, from the signal transferred by the remote controller 200, and correspondingly controls the display device 100.

As another example, the remote controller 200 calculates a coordinate value of a pointer, which corresponds to the operation of the remote controller 200, and outputs the calculated value to the user input interface 150 of the display device 100. In this case, the user input interface 150 of the display device 100 transfers information on the received coordinate values of the pointer, to the controller 170, without performing a process of compensating for the hand movement and the error.

In addition, as another example, unlike in the drawings, it is also possible that the coordinate value calculator 415 is included within the controller 170 instead of the user input interface 150.

Figure 5:
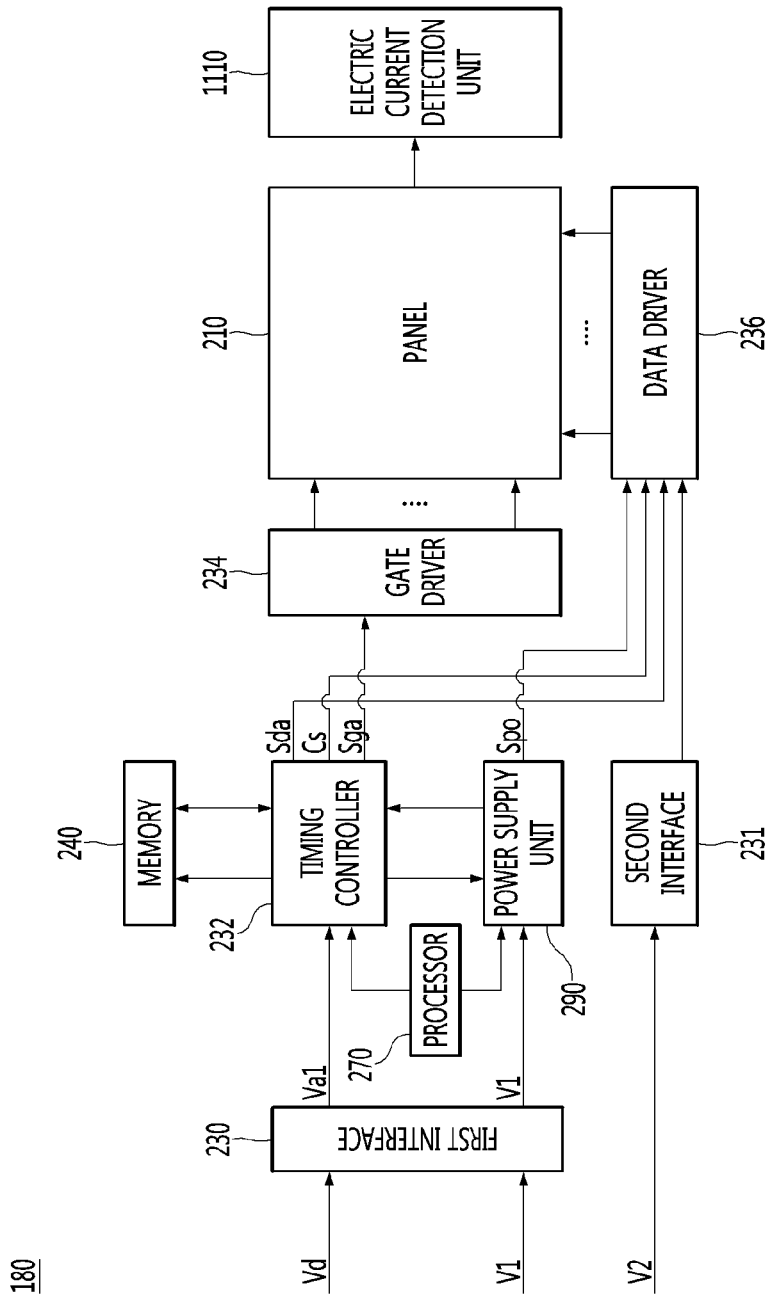
FIG. 5 is a block diagram of the inside of the display in FIG. 2.

FIG. 5 is a block diagram of the inside of the display in FIG. 2.

With reference with the drawings, the display 180 based on the organic light-emitting diode may include the OLED panel 210, a first interface 230, a second interface 231, a timing controller 232, a gate driver 234, a data driver 236, a memory 240, a processor 270, a power supply unit 290, an electric current detection unit 1110, and so on.

The display 180 receives an image signal Vd, a first direct current power V1, and a second direct current power V2. Based on the image signal Vd, the display 180 display a predetermined image is displayed.

On the other hand, the first interface 230 within the display 180 receives the image signal Vd and the first direct current power V1 from the controller 170.

At this point, the first direct current power V1 is used for operation for each of the power supply unit 290 and the timing controller 232 within the display 180.

Next, the second interface 231 receives the second direct current power V2 from the external power supply unit 190. On the other hand, the second direct current power V2 is input into the data driver 236 within the display 180.

Based on the image signal Vd, the timing controller 232 outputs a data drive signal Sda and a gate drive signal Sga.

For example, in a case where the first interface 230 converts the image signal Vd input, and outputs image signal va1 that results from the conversion, the timing controller 232 outputs the data drive signal Sda and the gate drive signal Sga based on the image signal va1 that results from the conversion.

The timing controller 232 further receives a control signal, the vertical synchronization signal Vsync, and so on, in addition to a video signal Vd from the controller 170.

The timing controller 232 outputs the gate drive signal Sga for operation of the gate driver 234 and the data drive signal Sda for operation of the data driver 236, based on the control signal, the vertical synchronization signal Vsync, and so on in addition to the video signal Vd.

In a case where the OLED panel 210 includes a subpixel for RGBW, the data drive signal Sda at this time is a data drive signal for a subpixel for RGBW.

On the other hand, the timing controller 232 further outputs a control signal Cs to the gate driver 234.

The gate driver 234 and the data driver 236 supplies a scanning signal and an image signal to the OLED panel 210 through a gate line GL and a data line DL according to the gate drive signal Sga and the data drive signal Sda, respectively, from the timing controller 232. Accordingly, a predetermined image is displayed on the OLED panel 210.

On the other hand, the OLED panel 210 includes an organic light-emitting layer. In order to display an image, many gate lines GL and many data lines DL are arranged to intersect each other in a matrix form, at each pixel that corresponds to the organic light-emitting layer.

On the other hand, the data driver 236 outputs a data signal to the OLED panel 210 based on the second direct current power V2 from the second interface 231.

The power supply unit 290 supplies various types of powers to the gate driver 234, the data driver 236, the timing controller 232, and so on.

The electric current detection unit 1110 detects an electric current that flows through a subpixel of the OLED panel 210. The electric current detected is input into the processor 270 and or so for accumulated electric-current computation.

The processor 270 performs various types of control within the display 180. For example, the gate driver 234, the data driver 236, the timing controller 232, and so on are controlled.

On the other hand, the processor 270 receives information of the electric current that flows through the subpixel of the OLED panel 210, from the electric current detection unit 1110.

Then, based on the information of the electric current that flows through the subpixel of the OLED panel 210, the processor 270 computes an accumulated electric current of a subpixel of each organic light-emitting diode (OLED) panel 210. The accumulated electric current computed is stored in the memory 240.

On the other hand, in a case where the accumulated electric current of the subpixel of each organic light-emitting diode (OLED) panel 210 is equal to or greater than an allowed value, the processor 270 determines the subpixel as a burn-in subpixel.

For example, in a case where the accumulated electric current of the subpixel of each organic light-emitting diode (OLED) panel 210 is 300000 A or higher, the subpixel is determined as a burn-in subpixel.

On the other hand, in a case where, among subpixels of each organic light-emitting diode (OLED) panel 210, an accumulated electric current of one subpixel approaches the allowed value, the processor 270 determines the one subpixel as expected to be a burn-in subpixel.

On the other hand, based on the electric current detected in the electric current detection unit 1110, the processor 270 determines a subpixel that has the highest accumulated electric current, as expected to be a burn-in subpixel.

Figure 6A:
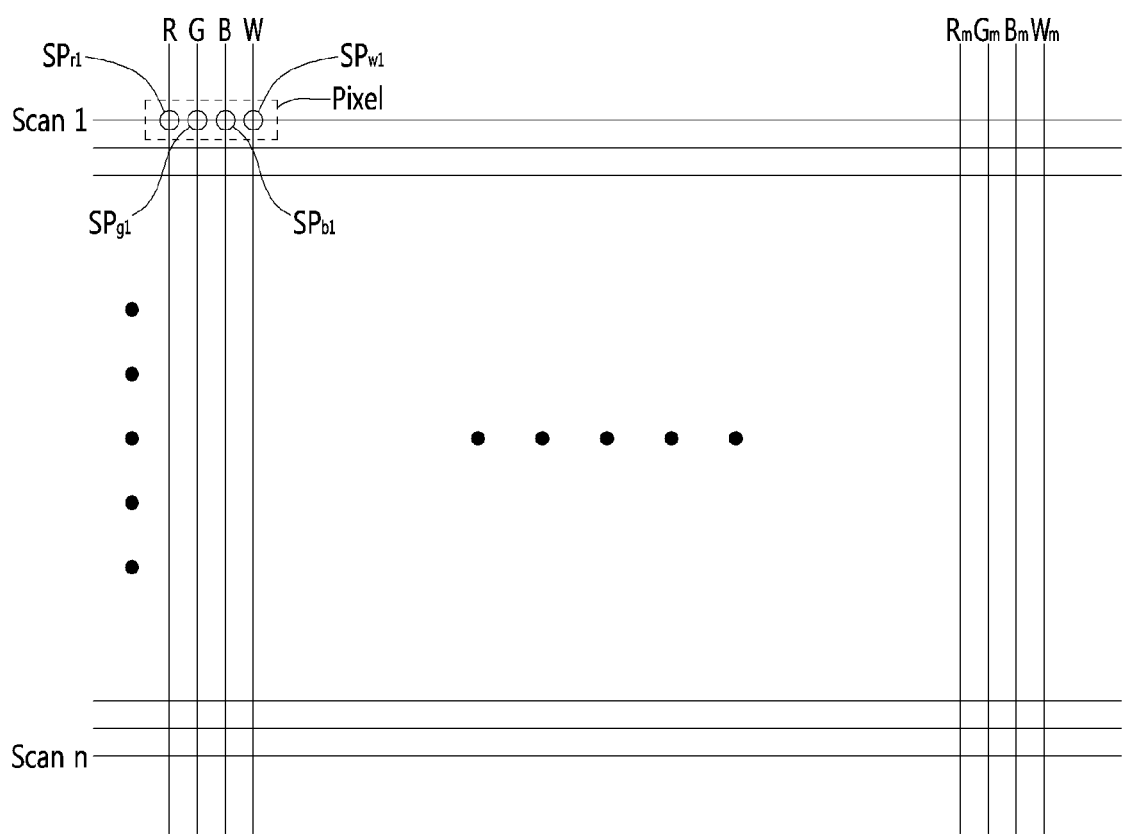
FIGS. 6A and 6B are diagrams that are referred to for description of the OLED panel in FIG. 5.
Figure 6B:
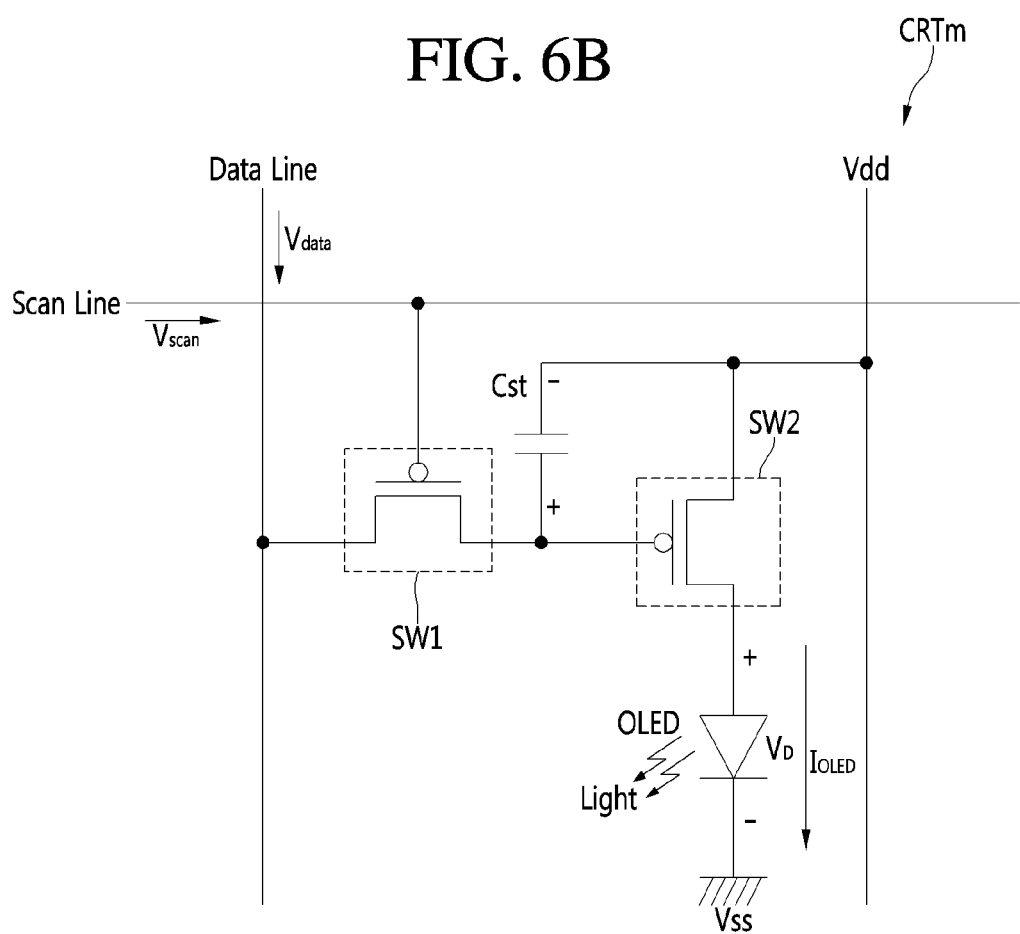

FIGS. 6A and 6B are diagrams that are referred to for description of the OLED panel in FIG. 5.

First, FIG. 6A is a diagram illustrating a pixel within the OLED panel 210.

With reference to the drawings, the OLED panel 210 includes a plurality of scan lines Scan 1 to Scan n and a plurality of data lines R1, G1, B1, W1 to Rm, Gm, Bm, Wm that intersect a plurality of scan lines Scan 1 to Scan n, respectively.

On the other hand, an area where the scan line and the data line within the OLED panel 210 intersect each other is defined as a subpixel. In the drawings, a pixel that includes a subpixel SPr1, SPg1, SPb1, SPw1 for RGBW is illustrated.

FIG. 6B illustrates a circuit of one subpixel within the OLED panel in FIG. 6A.

With reference to the drawings, an organic light-emitting subpixel circuit CRTm includes a switching element SW1, a storage capacitor Cst, a drive switching element SW2, and an organic light-emitting layer (OLED), which are active-type elements.

A scan line is connected to a gate terminal of the scan switching element SW1. The scanning switching element SW1 is turned on according to a scan signal Vscan input. In a case where the scan switching element SW1 is turned on, a data signal Vdata input is transferred to the gate terminal of the scan switching element SW2 or one terminal of the storage capacitor Cst.

The storage capacitor Cst is formed between the gate terminal and a source terminal of the drive switching element SW2. A predetermined difference between a data signal level transferred to one terminal of the storage capacitor Cst and a direct current (Vdd) level transferred to the other terminal of the storage capacitor Cst is stored in the storage capacitor Cst.

For example, in a case where data signals have different levels according to a pulse amplitude modulation (PAM) scheme, power levels that are stored in the storage capacitor Cst are different according to a difference between levels of data signals Vdata.

As another example, in a case where data signals have different pulse widths according to a pulse width modulation (PWM) scheme, power levels that are stored in the storage capacitor Cst are different according to a difference between pulse widths of data signals Vdata.

The drive switching element SW2 is turned on according to the power level stored in the storage capacitor Cst. In a case where the drive switching element SW2 is turned on, a drive electric current (IOLED), which is in proportion to the stored power level, flows through the organic light-emitting layer (OLED). Accordingly, the organic light-emitting layer (OLED) performs a light-emitting operation.

The organic light-emitting layer (OLED) includes a light-emitting layer (EML) for RGBW, which corresponds to a subpixel, and includes at least one of the following layers: a hole implementation layer (HIL), a hole transportation layer (HTL), an electron transportation layer (ETL), and an electron implementation layer (EIL). In addition to these, the organic light-emitting layer includes a hole support layer and so on.

On the other hand, when it comes to a subpixel, the organic light-emitting layer outputs while light, but in the case of the subpixels for green, red, and blue, a separate color filter is provided in order to realize color. That is, in the case of the subpixels for green, red, and blue, color filters for green, red, and blue, respectively, are further provided. On the other hand, in the case of the subpixel for white, white light is output and thus a separate color filter is unnecessary.

On the other hand, in the drawings, as the scan switching element SW1 and the drive switching element SW2, p-type MOSFETs are illustrated, but it is also possible that n-type MOSFETs, or switching elements, such as JETs, IGBTs, or SICs, are used.

When a pixel configuring the OLED panel 210 is continually controlled based on the same data for a certain time or more, the pixel can be degraded, causing the occurrence of an afterimage. In detail, since lifetimes of subpixels differ, a deviation between a periphery and a light emitting force of a lifetime-expired subpixel can occur, causing a problem of an afterimage.

Particularly, a lifetime of each of the red subpixel R, the green subpixel G, and the blue subpixel B is shorter than that of the white subpixel W generally, and thus, a lifetime of at least one of the red subpixel R, the green subpixel G, and the blue subpixel B may be expired prior to that of the white subpixel W, causing the occurrence of an afterimage. In this case, there is a limitation in reducing an afterimage by merely decreasing luminance, and thus, the occurrence of an afterimage can be minimized by adjusting saturation.

Here, saturation may be one of three color attributes and may denote a sharpness of a color representing the darkness and lightness of a color.

The OLED display device may display a video, based on RGB data, and the RGB data may include a pixel value for controlling each of the red subpixel R, the green subpixel G, and the blue subpixel B for each pixel.

The RGB data may include (r, g, b) pixel values respectively corresponding to a plurality of pixels. Here, r may be a brightness value of the red subpixel R, g may be a brightness value of the green subpixel G, and b may be a brightness value of the blue subpixel B. In this case, each of r, g, and b may be one of 0 to 255, 0 may be a darkest step, and 255 may be a brightest step. As a grayscale value increase from 0 to 255, brightness may increase.

For example, when at least one of r, g, and b is 0 and other one of r, g, and b has a specific brightness value, one of the red subpixel R, the green subpixel G, and the blue subpixel B may not be driven, but one other subpixel may be driven. For this reason, a lifetime difference between the red subpixel R, the green subpixel G, and the blue subpixel B may increase, and due to this, a possibility that an afterimage occurs can increase.

Therefore, the present invention may decrease saturation on the basis of the RGB data to reduce a chrominance component, thereby minimizing the occurrence of an afterimage.

Figure 7:
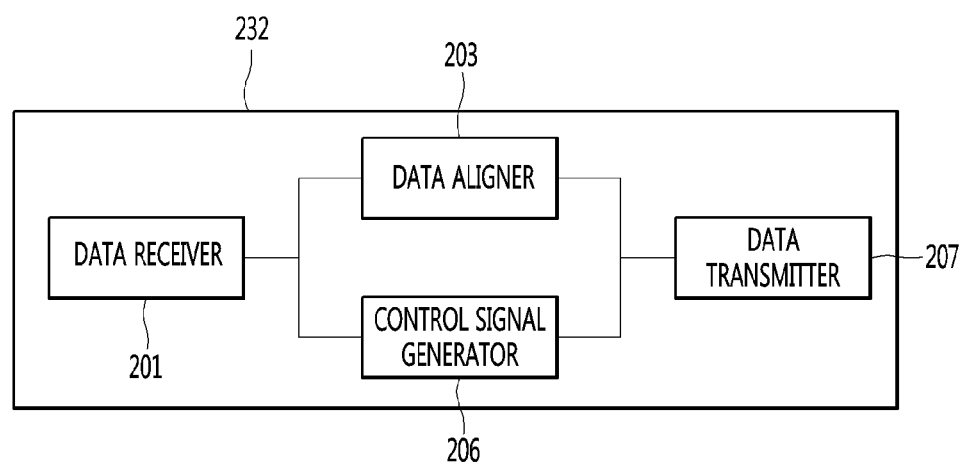
FIG. 7 illustrates an internal configuration of the timing controller of FIG. 3.

FIG. 7 illustrates an internal configuration of the timing controller of FIG. 5.

The timing controller 232 may include a data receiver 201, a data aligner 203, a control signal generator 206, and a data transmitter 207.

The data receiver 201 may receive at least one of a timing signal, R, G, and B data signals, a vertical synchronization signal Vsync, a horizontal synchronization signal Hsync, and a data enable signal DE from the controller 170, and the R, G, and B data signals may include frame-based RGB data of a video.

The data aligner 203 may receive the R, G, and B data signals from the data receiver 201 and may correct the RGB data included in the R, G, and B data signals to output corrected RGB data, based on a luminance reduction rate or a luminance correction rate which will each be described below.

The data aligner 203 may correct the RGB data.

The control signal generator 206 may receive the timing signal from the data receiver 201 to generate and output a data drive signal Sda and a gate drive signal Sga for respectively controlling the data driver 184 and the gate driver 185.

The data transmitter 207 may receive the corrected RGB data from the data aligner 203 and may receive the data drive signal Sda and the gate drive signal Sga from the control signal generator 205. The data transmitter 207 may transmit the corrected RGB data and the data drive signal Sda to the data driver 184 and may transmit the gate drive signal Sga to the gate driver 185.

The controller 170 may control the display 180 to decrease a saturation of a specific region, thereby minimizing the occurrence of an afterimage. The controller 170 may sense a fixed region in a video, obtain RGB data of the sensed fixed region, and reduce a saturation of the fixed region, based on the RGB data.

Figure 8:
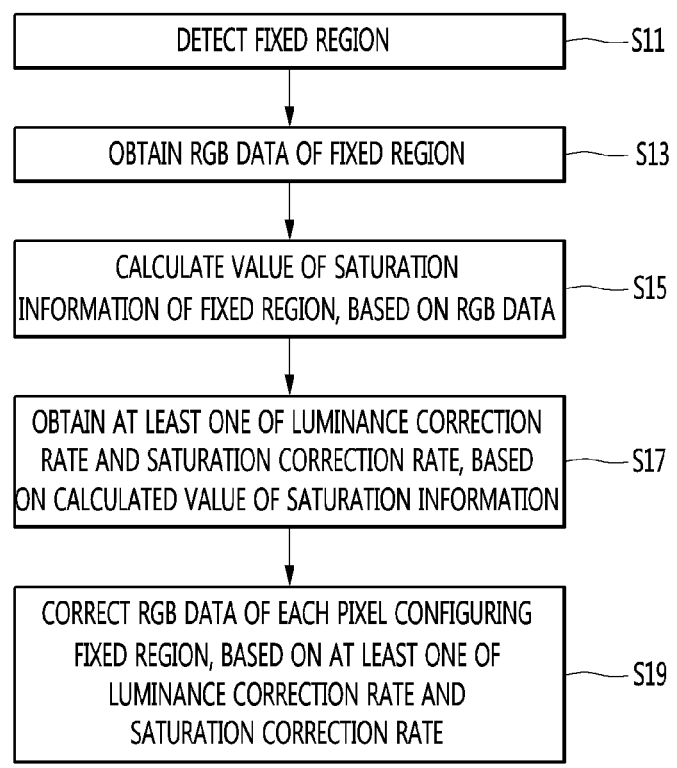
FIG. 8 is a flowchart illustrating an operating method of the display device according to an embodiment of the present invention.

FIG. 8 is a flowchart illustrating an operating method of the display device according to an embodiment of the present invention.

In operation S11, the controller 170 may detect a fixed region.

Here, the fixed region may denote a region including a pixel where a variation of a pixel value performed for a certain time is equal to or less than a reference value. For example, the fixed region may be a region which displays a name of a broadcaster, a logo such as a name of a program, a sports playing situation, fixed subtitles, and/or the like.

Figure 9:
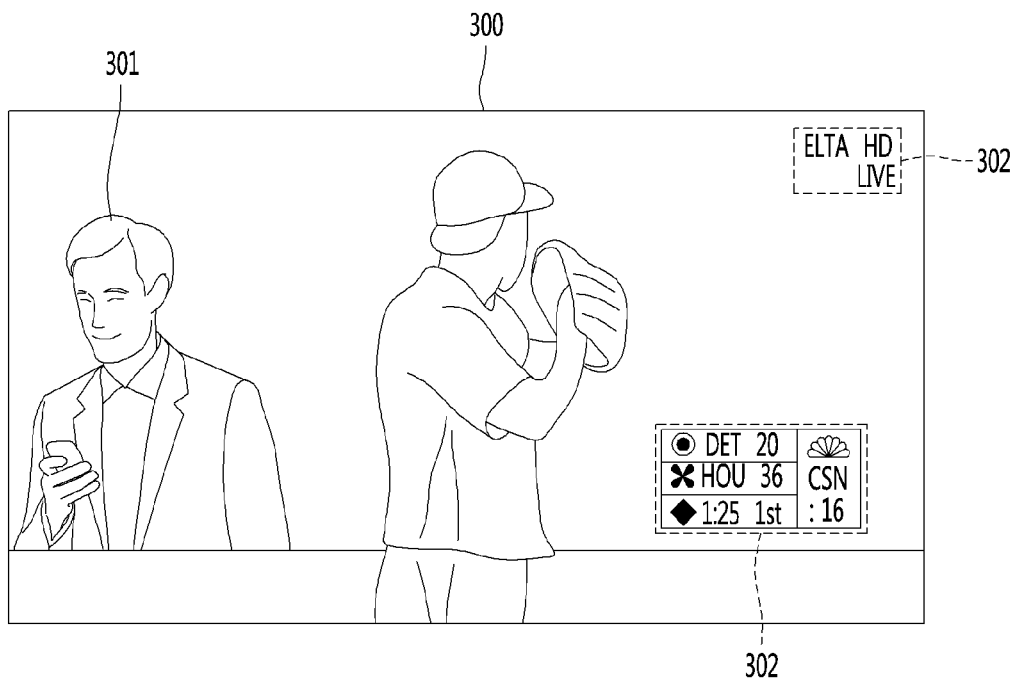
FIG. 9 is an exemplary diagram illustrating a fixed region according to an embodiment of the present invention.

FIG. 9 is an exemplary diagram illustrating a fixed region according to an embodiment of the present invention.

The controller 170 may output a received video 300, and the video 300 may include an unfixed region 301 and a fixed region 302. The fixed region 302 may include pixels where a variation of a pixel value is equal to or less than a reference value, and the unfixed region 301 may be a region other than the fixed region 302.

According to an embodiment, the controller 170 may compare RGB data of a current frame with RGB data of a previous frame to detect a fixed region. In detail, the controller 170 may calculate a pixel value difference between a pixel-based pixel value of the current frame and a pixel-based pixel value of the previous frame, sense a fixed pixel where the pixel value difference is equal to or less than a reference value, and detect a region, including pixels which are sensed as fixed pixels for a certain time or more, as the fixed region.

According to another embodiment, the controller 170 may further receive a logo information signal when receiving a video signal through the broadcast reception unit 130, and the logo information signal may include information representing a fixed region.

FIG. 8 will be described again.

In operation S13, the controller 170 may obtain RGB data of the fixed region.

The controller 170 may obtain the RGB data which is a pixel value of each of a plurality of pixels configuring the detected fixed region. That is, the controller 170 may obtain (r, g, b) pixel values of the plurality of pixels configuring the detected fixed region.

In operation S15, the controller 170 may calculate a value of saturation information of the fixed region, based on the RGB data.

The controller 170 may calculate the value of saturation information of the fixed region, based on the (r, g, b) pixel values of the plurality of pixels configuring the fixed region.

Here, the value of saturation information of the fixed region may be a constant which is a numerical value corresponding to saturation information of at least one pixel configuring the fixed region.

The controller 170 may calculate a value of saturation information, based on a difference between a maximum pixel value and a minimum pixel value of at least one pixel configuring the fixed region.

Here, the maximum pixel value may be a largest value of (r, g, b) pixel values of a corresponding pixel, and the minimum pixel value may be a smallest value of the (r, g, b) pixel values of the corresponding pixel. For example, (r, g, b) pixel values of any one pixel included in a fixed region may be (40, 50, 0), and in this case, a maximum pixel value may be 150 and a minimum pixel value may be 0.

The controller 170 may calculate a value of saturation information of each of the plurality of pixels configuring the fixed region, or may divide the fixed region into a plurality of blocks and may a value of saturation information of each of the plurality of blocks. This will be described in detail with reference to FIG. 10.

Figure 10:
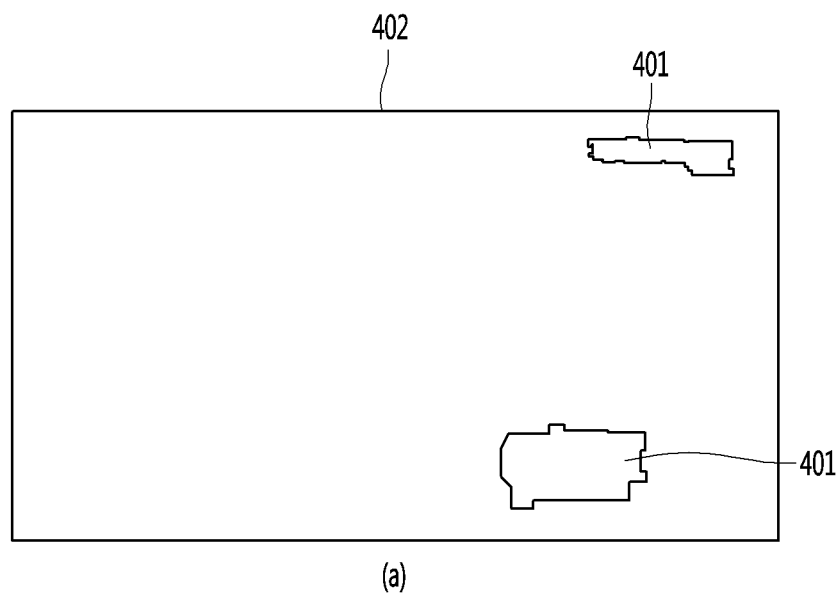
FIG. 10 is an exemplary diagram illustrating a method of calculating a value of saturation information of a fixed region according to an embodiment of the present invention.
Figure 10:
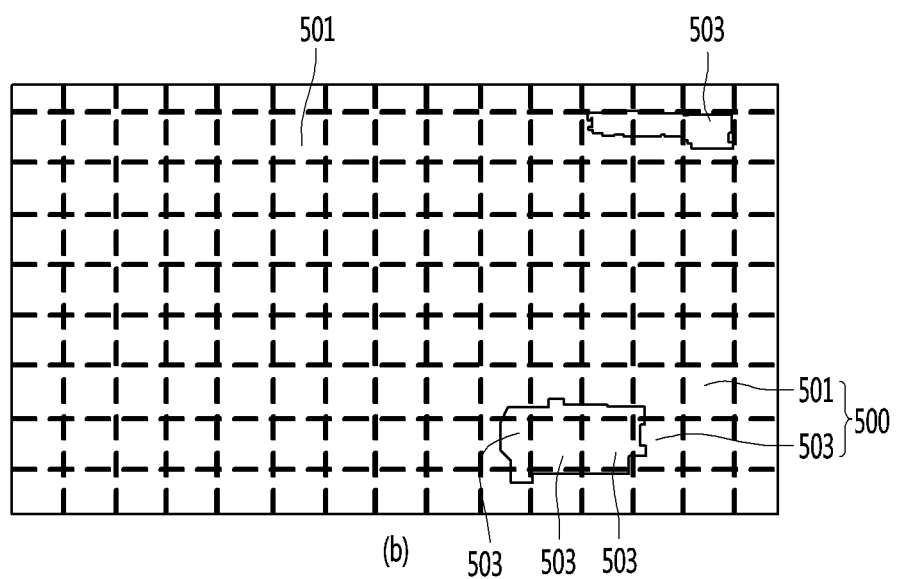

FIG. 10 is an exemplary diagram illustrating a method of calculating a value of saturation information of a fixed region according to an embodiment of the present invention.

According to an embodiment, as illustrated in FIG. 10A, the controller 170 may divide a screen into a fixed region 401 and an unfixed region 402 and may calculate a value of saturation information of each of a plurality of pixels configuring the fixed region 401.

In this case, the controller 170 may calculate the value of saturation information of each of the plurality of pixels configuring the fixed region 401, and then, may reduce a saturation of the fixed region, thereby securing the reliability of an afterimage reducing function.

According to another embodiment, as illustrated in FIG. 10B, the controller 170 may divide a screen into a plurality of blocks 500, and the plurality of blocks 500 may each include two or more pixels. That is, each of the blocks 500 may denote a region which is wider than a region occupied by one pixel.

The controller 170 may divide the blocks 500 into a block 501 including a fixed region and a block 503 including no fixed region. The block 501 including the fixed region may be a block including at least a portion of the fixed region which is detected in operation S11, and the block 503 including no fixed region may be a block which does not include the fixed region at all.

The controller 170 may calculate a value of saturation information of each block 501 including the fixed region. In detail, the controller 170 may calculate the value of saturation information of each block 501 including the fixed region, based on a difference between a maximum pixel value, which is a largest pixel value of (r, g, b) pixel values of a plurality of pixels included in any one block 501 including a fixed region, and a minimum pixel value which is a smallest pixel value of the (r, g, b) pixel values of the plurality of pixels.

As described above, in a case where a fixed region is divided into a plurality of blocks and a value of saturation information is calculated, the number of calculated values of saturation information may be smaller than the number of calculated values of saturation information in a case where a value of saturation information of each of a plurality of pixels configuring a fixed region is calculated. Accordingly, a speed at which a value of saturation information is calculated may be improved, and a memory may be secured.

FIG. 8 will be described again.

In operation S17, the controller 170 may obtain at least one of a saturation correction rate and a luminance correction rate, based on the value of saturation information.

Alternatively, the controller 170 may obtain at least one of a saturation reduction rate and a luminance reduction rate, based on the value of saturation information.

The saturation correction rate may denote a rate for correcting RGB data of each pixel, and the saturation reduction rate may denote a value obtained by subtracting the saturation correction rate from a maximum rate (100%).

The luminance correction rate may denote a rate for correcting a current value supplied to each pixel, and the luminance reduction rate may denote a value obtained by subtracting the luminance correction rate from a maximum rate (100%).

The controller 170 may obtain one of the saturation correction rate and the luminance correction rate, based on the value of saturation information and may obtain the saturation reduction rate or the luminance reduction rate, based on the saturation correction rate or the luminance correction rate.

On the other hand, the controller 170 may obtain one of the saturation reduction rate and the luminance reduction rate, based on the value of saturation information and may obtain the saturation correction rate or the luminance correction rate, based on the saturation reduction rate or the luminance reduction rate.

The memory 140 may store saturation correction rates mapped to values of saturation information.

For example, the memory 140 may store a lookup table where the saturation correction rates are mapped to the values of saturation information.

Figure 11:
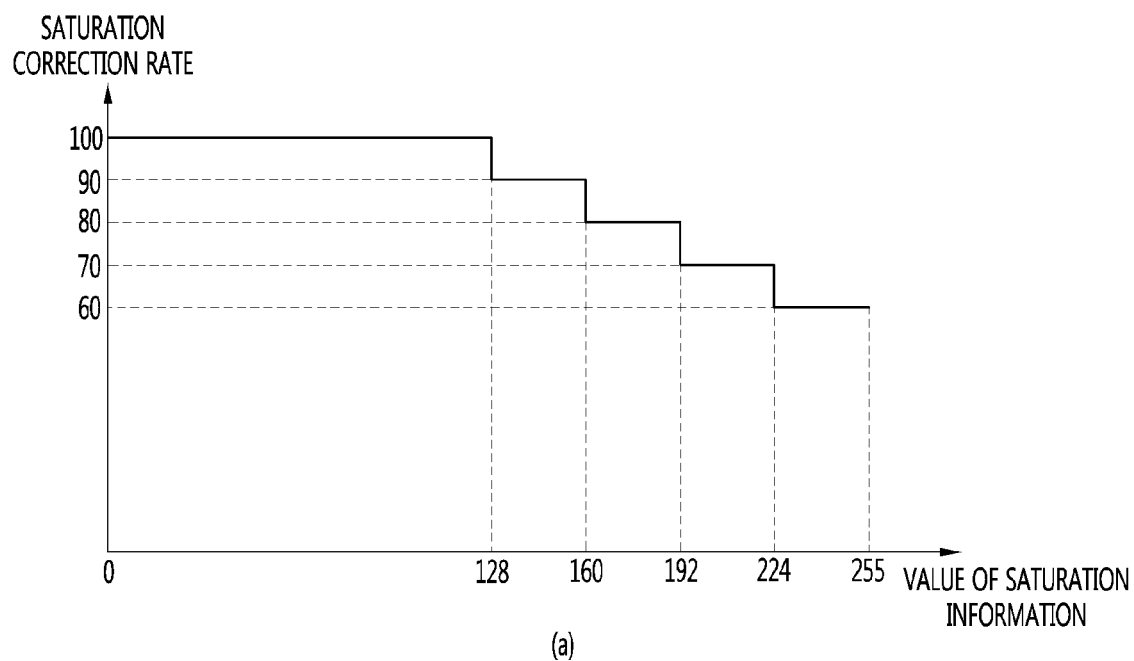
FIG. 11 is an exemplary diagram illustrating a saturation correction rate according to an embodiment of the present invention.
Figure 11:
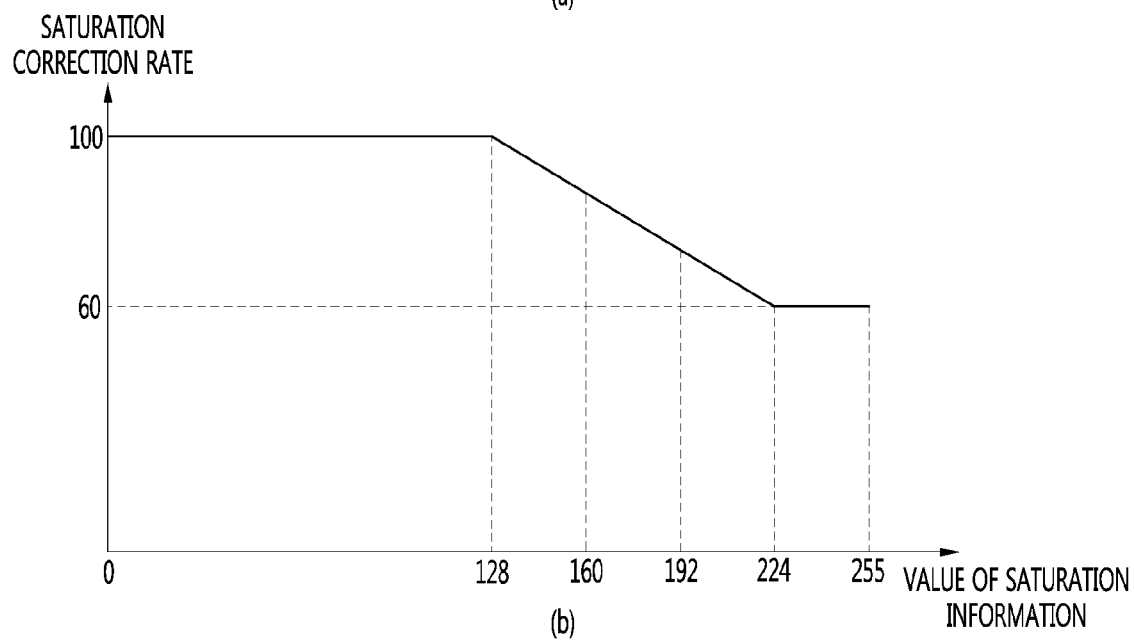

FIG. 11 is an exemplary diagram illustrating a saturation correction rate according to an embodiment of the present invention.

Referring to FIG. 11A, the memory 140 may store saturation correction rate information based on a value of saturation information, which represents that a saturation correction rate is 100 when a value of saturation information is 0 or more and less than 128, a saturation correction rate is 90 when a value of saturation information is 128 or more and less than 160, a saturation correction rate is 80 when a value of saturation information is 160 or more and less than 192, a saturation correction rate is 70 when a value of saturation information is 192 or more and less than 224, and a saturation correction rate is 60 when a value of saturation information is 224 to 255.

Alternatively, referring to FIG. 11B, the memory 140 may store saturation correction rate information representing that a saturation correction rate is 100 when a value of saturation information is 0 or more and less than 128, a saturation correction rate is 60 when a value of saturation information is 224 to 255, and a saturation correction rate is reduced at a predetermined rate within a range from 60 to 100 when a value of saturation information is 128 or more and less than 224. For example, the predetermined rate may be about 0.4, and in this case, when a value of saturation information is 128 or more and less than 224, the controller 170 may reduce a saturation correction rate by 0.4 whenever a value of saturation information increases by one, thereby obtaining a saturation correction rate.

When a value of saturation information is within a first range, the controller 170 may set a saturation correction rate to a first rate, and when a value of saturation information is within a second range which is greater in value than the first range, the controller 170 may set a saturation correction rate to a second rate which is less than the first rate. For example, when a value of saturation information is within a range from 128 or more to less than 160, the controller 170 may set a saturation correction rate to 90%, and when a value of saturation information is within a range from 192 or more to less than 224 which is greater in value than the range from 128 or more to less than 160, the controller 170 may set a saturation correction rate to 70% which is less than 90%.

As described above, the controller 170 may obtain a pixel-based or block-based saturation correction rate of a fixed region, based on saturation information rate information based on the value of saturation information stored in the memory 140.

According to an embodiment, the controller 170 may obtain a saturation correction rate when a value of saturation information is equal to or greater than a predetermined reference value.

That is, according to an embodiment of the present invention, the controller 170 may obtain a saturation correction rate according to a value of saturation information regardless of a reference value, thereby decreasing a saturation of a fixed region. In this case, the controller 170 may always decrease the saturation of the fixed region, thereby minimizing a reduction in lifetime of each pixel.

Alternatively, according to another embodiment of the present invention, the controller 170 may compare a value of saturation information with a reference value, and only when the value of saturation information is equal to or greater than the reference value, the controller 170 may obtain a saturation correction rate to reduce a saturation of a fixed region. In this case, when the saturation of the fixed region is less than a reference value, the controller 170 may maintain saturation, and thus, it is possible to sharply display a logo of the fixed region and the like.

The controller 170 may compare the value of saturation information with the reference value to determine whether to correct the saturation of the fixed region. The controller 170 may previously set the reference value.

For example, the reference value may be 128. In this case, only when the value of saturation information is 128 or more, the controller 170 may obtain the saturation correction rate to correct the saturation of the fixed region, and when the value of saturation information is less than 128, the controller 170 may maintain the saturation of the fixed region.

According to an embodiment, the controller 170 may obtain a luminance correction rate simultaneously when obtaining a saturation correction rate.

According to an embodiment, the controller 170 may obtain a luminance correction rate based on a value of saturation information, based on the lookup table stored in the memory 140. That is, the memory 140 may store luminance correction rates mapped to values of saturation information, and the controller 170 may obtain the luminance correction rates mapped to values of saturation information from the memory 140.

According to another embodiment, the controller 170 may obtain a luminance correction rate, based on a saturation correction rate. In detail, the controller 170 may obtain the saturation correction rate and may add a predetermined value to the obtained saturation correction rate to obtain the luminance correction rate. Alternatively, the controller 170 may divide a saturation reduction rate by a predetermined value to calculate a luminance reduction rate, thereby obtaining the luminance correction rate.

For example, when an obtained saturation correction rate is 90%, the controller 170 may obtain, as a luminance correction rate, 95 which is obtained by adding a predetermined value "5" to a saturation correction rate "90". As another example when a saturation reduction rate is 10, the controller 170 may obtain, as a luminance reduction rate, 5 which is obtained by dividing the saturation reduction rate "10" by a predetermined value "2", and then, may obtain 95, obtained by subtracting 5 from 100, as a luminance correction rate.

The controller 170 may set a luminance correction rate lower than a saturation correction rate. The controller 170 may set a luminance reduction rate higher than a saturation reduction rate.

Figure 12:
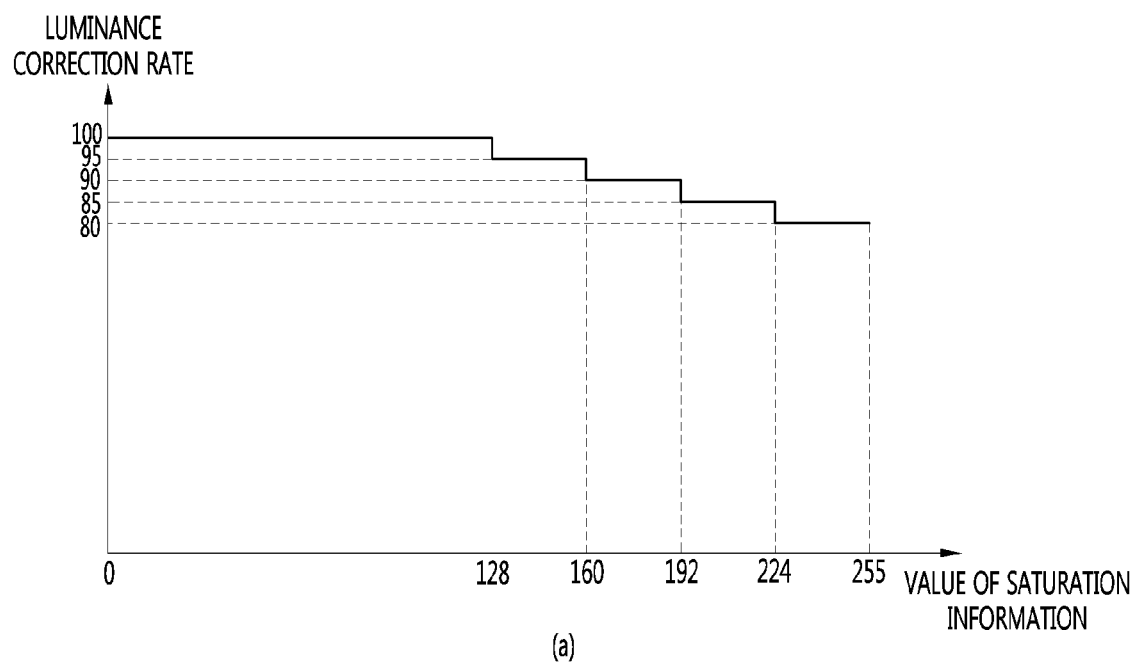
FIG. 12 is an exemplary diagram illustrating a luminance correction rate according to an embodiment of the present invention.
Figure 12:
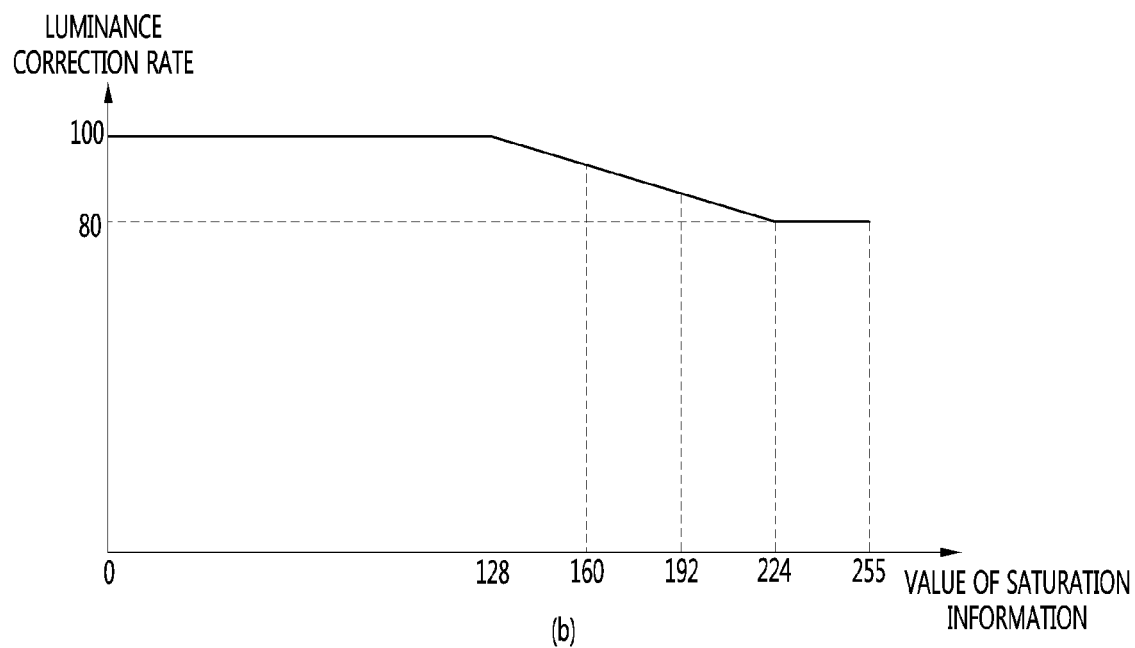

FIG. 12 is an exemplary diagram illustrating a luminance correction rate according to an embodiment of the present invention.

Referring to FIG. 12A, the memory 140 may store luminance correction rate information based on a value of saturation information, which represents that a luminance correction rate is 100 when a value of saturation information is 0 or more and less than 128, a luminance correction rate is 95 when a value of saturation information is 128 or more and less than 160, a luminance correction rate is 90 when a value of saturation information is 160 or more and less than 192, a luminance correction rate is 85 when a value of saturation information is 192 or more and less than 224, and a luminance correction rate is 80 when a value of saturation information is 224 to 255.

Alternatively, referring to FIG. 12B, the memory 140 may store luminance correction rate information representing that a luminance correction rate is 100 when a value of saturation information is 0 or more and less than 128, a luminance correction rate is 80 when a value of saturation information is 224 to 255, and a luminance correction rate is reduced at a predetermined rate within a range from 80 to 100 when a value of saturation information is 128 or more and less than 224. For example, the predetermined rate may be about 0.2, and in this case, when a value of saturation information is 128 or more and less than 224, the controller 170 may reduce a luminance correction rate by 0.2 whenever a value of saturation information increases by one, thereby obtaining a luminance correction rate.

When a value of saturation information is within a first range, the controller 170 may set a luminance correction rate to a first rate, and when a value of saturation information is within a second range which is greater in value than the first range, the controller 170 may set a luminance correction rate to a second rate which is less than the first rate. For example, when a value of saturation information is within a range from 128 or more to less than 160, the controller 170 may set a luminance correction rate to 95%, and when a value of saturation information is within a range from 192 or more to less than 224 which is greater in value than the range from 128 or more to less than 160, the controller 170 may set a luminance correction rate to 85% which is less than 95%.

As described above, the controller 170 may obtain a pixel-based or block-based luminance correction rate of a fixed region, based on an obtained luminance saturation rate or luminance information rate information based on a value of saturation information stored in the memory 140.

FIG. 8 will be described again.

In operation S19, the controller 170 may correct RGB data of each pixel configuring the fixed region, based on one of a saturation correction rate and a luminance correction rate.

The controller 170 may correct (r, g, b) pixel values of each pixel configuring the fixed region, based on the saturation correction rate. At this time, the controller 170 may not change the saturation of the unfixed region. That is, the controller 170 may not change the (r, g, b) pixel values of the pixels constituting the unfixed region area.

Therefore, the controller 170 may maintain the RGB data of the unfixed region among the RGB data of the input video and correct only the RGB data of the fixed region.

Figure 13:
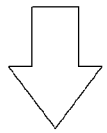
FIG. 13 is an exemplary diagram illustrating a method of correcting RGB data on the basis of a saturation correction rate according to an embodiment of the present invention.

FIG. 13 is an exemplary diagram illustrating a method of correcting RGB data on the basis of a saturation correction rate according to an embodiment of the present invention.

The embodiment of FIG. 13 may be an embodiment where a screen is configured with 6×6 pixels and a pixel located at a (4, 5) position, a pixel located at a (4, 6) position, a pixel located at a (5, 5) position, and a pixel located at a (5, 6) position in the screen are detected as pixels of a fixed region.

In the embodiment of FIG. 13, the controller 170 may obtain a saturation correction rate "80%" and may obtain a luminance correction rate "90%". Alternatively, the controller 170 may obtain a saturation reduction rate "20%" and may obtain a luminance reduction rate "10%".

The controller 170 may correct a pixel value (0, 50, 0) of a pixel, which is located at a (4, 5) position and configures a fixed region, of all pixels configuring a screen, to (0, 40, 0) according to the luminance correction rate "90%", correct a pixel value (30, 0, 230) of a pixel, located at a (4, 6) position, to (24, 40, 184) according to the luminance correction rate "90%", correct a pixel value (200, 10, 230) of a pixel, located at a (5, 5) position, to (160, 8, 0) according to the luminance correction rate "90%", and correct a pixel value (0, 250, 10) of a pixel, located at a (5, 6) position, to (0, 200, 8) according to the luminance correction rate "90%".

As described above, the controller 170 may correct a pixel value of a pixel configuring a fixed region according to a luminance correction rate to reduce a saturation of the fixed region, thereby minimizing a reduction in lifetime of the pixel configuring the fixed region.

Moreover, when decreasing a saturation of a fixed region, the controller 170 may reduce a luminance of the fixed region.

When obtaining a saturation correction rate and a luminance correction rate, the controller 170 may reduce a saturation of a fixed region and may simultaneously correct a current supplied to each pixel configuring the fixed region, based on the luminance correction rate. At this time, the controller 170 may not change the luminance of the unfixed region. That is, the controller 170 may not change the current supplied to each pixel configuring the unfixed region.

Therefore, the controller 170 may maintain the current supplied to each pixel of the unfixed region and correct the current supplied to each pixel configuring to the fixed region.

The controller 170 may correct RGB data of a fixed region according to a saturation correction rate and may reduce a current supplied to each pixel included in the display 180 according to a luminance correction rate.

In the embodiment of FIG. 13, a current supplied to each pixel configuring a screen may be 10 A before correcting luminance, and the controller 170 may correct a current, supplied to each pixel configuring a fixed region, from 10 A to 9 A according to a luminance correction rate "90%". In this case, a current supplied to the fixed region may be reduced, thereby minimizing the occurrence of an afterimage in the fixed region.

In FIGS. 8 to 13, it has been described above that saturation reduction rates of r, g, and b are the same, but this is merely an embodiment given for convenience of description and the present invention is not limited thereto.

That is, according to an embodiment, the controller 170 may perform control so that the saturation reduction rates of r, g, and b differ.

For example, the controller 170 may perform control so that the saturation reduction rates of r, g, and b differ, based on lifetimes of the red subpixel R, the green subpixel G, and the blue subpixel B. When a lifetime of the red subpixel R is 4,000 hours, a lifetime of the green subpixel G is 4,000 hours, and a lifetime of the blue subpixel B is 3,000 hours, the controller 170 may set luminance reduction rates of r and g to 10% and may set a luminance reduction rate of b to 20%.

According to the embodiments of the present invention, since a saturation of a fixed region is reduced in a video displayed by the display, the occurrence of an afterimage in the video can be minimized, and a reduction in lifetime of each pixel included in the display can be minimized.

Moreover, only when a value of saturation information of the fixed region satisfies a criterion, the saturation of the fixed region may be reduced, and thus, the saturation of the fixed region may be corrected to a predetermined level or more, thereby securing reliability and minimizing the occurrence of an afterimage.

Moreover, a saturation correction rate may be obtained based on the value of saturation information of the fixed region to reduce saturation, and thus, saturation may be differently corrected based on a saturation variation of the fixed region. In this case, the saturation of the fixed region may be maintained at a certain level, thereby minimizing a sense of difference felt by a user.

Moreover, a luminance of the fixed region may be reduced simultaneously when decreasing the saturation of the fixed region, thereby maximizing an effect of preventing the occurrence of an afterimage in the fixed region.

Moreover, a luminance correction rate may be set to be less than the saturation correction rate, thereby increasing a video identification rate in the fixed region.

The above description is merely illustrative of the technical idea of the present invention, and various modifications and changes may be made thereto by those skilled in the art without departing from the essential characteristics of the present invention.

Therefore, the embodiments of the present invention are not intended to limit the technical spirit of the present invention but to illustrate the technical idea of the present invention, and the technical spirit of the present invention is not limited by these embodiments.

The scope of protection of the present invention should be interpreted by the appending claims, and all technical ideas within the scope of equivalents should be construed as falling within the scope of the present invention.

What is claimed is:

1. An organic light emitting diode (OLED) display device comprising:
    a display configured to display a video; and
    a controller configured to:
    sense a fixed region in the displayed video, wherein the fixed region is a region including pixels where a variation of a pixel value for a certain time is less than or equal to a reference value;
    obtain RGB data of the fixed region;
    calculate saturation information of the fixed region based on the obtained RGB data of the fixed region;
    reduce saturation of the fixed region when the saturation information is greater than or equal to a predetermined reference value; and
    maintain the saturation of the fixed region when the saturation information is less than the predetermined reference value.

2. The OLED display device of claim 1, wherein the controller is further configured to:
    obtain a saturation correction rate based on the saturation information; and
    reduce the saturation of the fixed region based on the saturation correction rate.

3. The OLED display device of claim 2, further comprising a memory configured to store a lookup table which maps saturation correction rates to corresponding saturation information,
    wherein the controller is further configured to obtain the saturation correction rate using the lookup table.

4. The OLED display device of claim 3, wherein the controller is further configured to:
    set the saturation correction rate to a first rate when the saturation information is within a first range; and
    set the saturation correction rate to a second rate greater than the first rate when the saturation information is within a second range greater than the first range.

5. The OLED display device of claim 3, wherein the controller is further configured to decrease the saturation correction rate to a predetermined rate as the saturation information increases.

6. The OLED display device of claim 5, wherein the controller is further configured to decrease a luminance of the fixed region when the saturation of the fixed region is reduced.

7. The OLED display device of claim 1, wherein the controller is further configured to decrease a luminance of the fixed region when the saturation of the fixed region is reduced.

8. The OLED display device of claim 7, wherein the controller is further configured to decrease the saturation of the fixed region more than the luminance of the fixed region.

9. The OLED display device of claim 2, wherein the controller is further configured to:
    obtain the saturation correction rate and a luminance correction rate based on the saturation information when the saturation information is greater than or equal to the predetermined reference value, and
    correct the RGB data of the fixed region according to the saturation correction rate and decrease a current supplied to a pixel included in the display according to the luminance correction rate.

10. The OLED display device of claim 9, wherein the luminance correction rate is less than the saturation correction rate.

11. The OLED display device of claim 1, wherein the display comprises:
    a panel comprising a plurality of pixels;
    a gate driver and a data driver configured to drive the panel; and
    a timing controller comprising:
    a data receiver configured to receive RGB data from the controller;
    a data aligner configured to correct the RGB data;
    a control signal generator configured to generate a control signal of the gate driver and the data driver; and
    a data transmitter configured to transmit, to the gate driver and the data driver, the generated control signal and corrected RGB data output from the data aligner.

12. The OLED display device of claim 2, wherein the controller is configured to compare RGB data of a current frame with RGB data of a previous frame,
- calculate a pixel value difference between a pixel-based pixel value of the current frame and a pixel-based pixel value of the previous frame,
- sense a fixed pixel where the pixel value difference is equal to or less than a reference value,
- detect a region, including pixels which are sensed as fixed pixels for a certain time or more, as the fixed region, and
- detect a unfixed region which is a region other than the fixed region.

13. The OLED display device of claim 12, wherein the controller is configured to maintain the saturation of the unfixed region.

14. The OLED display device of claim 1, wherein the controller is configured to detect the fixed region by receiving a logo information signal, wherein the logo information signal may include information representing the fixed region.

* * * * *